(12) United States Patent
Themel

(10) Patent No.: US 6,666,650 B1
(45) Date of Patent: Dec. 23, 2003

(54) WIND POWER FACILITY WITH A VERTICLE ROTOR

(76) Inventor: Ramona Themel, Goethestrasse 69, D-08060 Zwickau (DE)

( * ) Notice: Subject to any disclaimer, the term of this patent is extended or adjusted under 35 U.S.C. 154(b) by 0 days.

(21) Appl. No.: 09/980,074

(22) PCT Filed: May 4, 2000

(86) PCT No.: PCT/DE00/01487
§ 371 (c)(1),
(2), (4) Date: Apr. 26, 2002

(87) PCT Pub. No.: WO00/68569
PCT Pub. Date: Nov. 16, 2000

(30) Foreign Application Priority Data

May 5, 1999 (DE) .......................... 199 20 560

(51) Int. Cl.[7] .............................. B64C 11/48
(52) U.S. Cl. .................. 416/200 R; 416/119; 415/4.2; 415/141
(58) Field of Search ................. 415/2 R, 3 A, 415/141, 4.2, 4.4, 3.1, 4.5, 907; 416/200 R, 119, 197 A, 139, 236 R

(56) References Cited

U.S. PATENT DOCUMENTS

| | | | |
|---|---|---|---|
| 3,938,907 A | * | 2/1976 | Magoveny et al. ......... 415/141 |
| 4,047,834 A | | 9/1977 | Magoveny et al. |
| 4,278,896 A | * | 7/1981 | McFarland ................. 290/55 |
| 4,457,666 A | * | 7/1984 | Selman, Jr. ................ 415/203 |
| 5,391,926 A | * | 2/1995 | Staley et al. ............... 290/55 |
| 5,463,257 A | | 10/1995 | Yea |
| 6,465,899 B2 | * | 10/2002 | Roberts ..................... 290/44 |

FOREIGN PATENT DOCUMENTS

| | | |
|---|---|---|
| DE | 196230855 | 1/1997 |
| DE | 29704024 | 6/1997 |
| DE | 19823473 | 12/1999 |
| FR | 22596 | 7/1921 |
| GB | 2049066 | 12/1980 |
| WO | WO9119093 | 12/1991 |

* cited by examiner

Primary Examiner—Edward K. Look
Assistant Examiner—J. M. McAleenan
(74) Attorney, Agent, or Firm—Jordan and Hamburg LLP

(57) ABSTRACT

The invention relates to a wind power facility with a vertical rotor for generating energy, wherein a three-blade rotor (5) operates according to the cross-flow principle. The outer admission surface construction (1) and the facility has the shape of a tower consisting of stories. The individual stories are separated by floors (7). Vertical and horizontal admission surface elements (12, 13) form compartments through which wind is fed to the blades (1, 2,3) of the rotor (5). The admission surface construction (11) and the blades (1, 2, 3) of the rotor have a specific constructional design and form an integral unit.

20 Claims, 3 Drawing Sheets

WIND POWER FACILITY WITH A VERTICLE ROTOR

Figure 2:
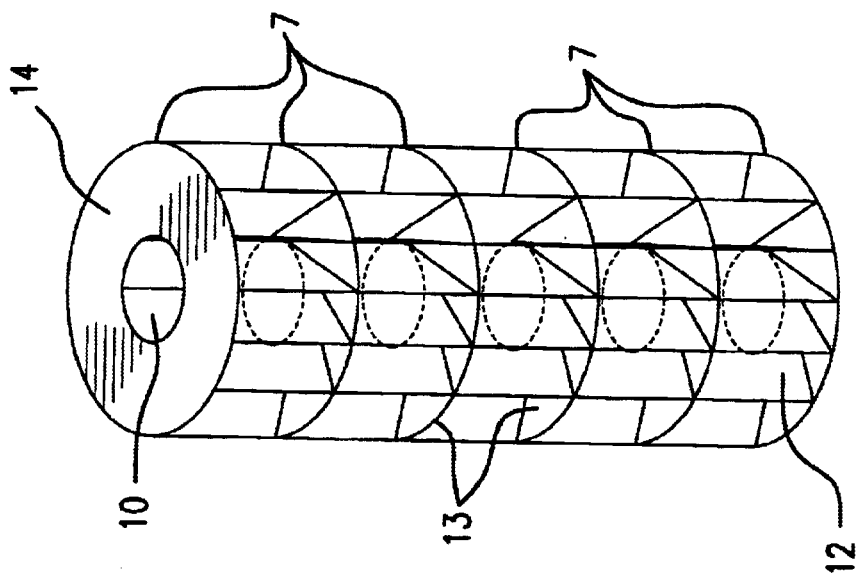

The invention relates to a wind power facility with a vertical rotor for producing energy, 3-wing rotor being used. The 3-wing rotor operates with a rotor axle, which stands vertically in the wind. The field of use for the inventive wind power facility with a vertical rotor is the home area as well as the industrial area. In addition, the use of these wind power facilities is possible practically in wind parks, on the roofs of buildings and also on ships.

The DE 31 29 680 discloses a wind wheel for converting wind energy into rotational movement, for which, for a wind power machine, with a rotor, which is constructed with a plurality of rotor blades and the rotor axle of which is perpendicular to the plane of the possible wind direction, an increase in efficiency is said to be achieved owing to the fact that the rotor is surrounded by a stator, which has a plurality of stator blades, which are equally far apart, extend obliquely to the rotor, terminate at a lateral peripheral surface of the rotor and formed channels which taper towards the rotor.

It is, however, a disadvantage of this wind wheel and its facility that they utilize too small a portion of the admission surfaces, standing in the wind, for conversion into energy. This is due to the fact that the admission surfaces sit too flat, as a result of which about one-fourth of the wind power does not have an effect and is passed to the outside. Since there is no flow-through of the rotor, the flow velocity attained is less than that absolutely necessary by about 15 percent. At best, this rotor is able to convert only about 15 percent of the wind power from the area of the pressure. As a result, the output decreases appreciably under load.

This equipment is therefore not suitable for small a wind speeds. In the selected arrangement, the rotor and the admission surfaces do not ensure an effective interaction.

Moreover, a further wind power facility is known from the WO 81/00463. This facility has 12 admission surfaces which, however, are constructed too flat, the horizontally disposed admission surfaces being sent at too steep an angle. This is associated with the disadvantage that an undesirably high pressure builds up, as a result of which there is backflow. The rotor has twenty-four blades and works without flow-through, about 15% of the necessary flow velocity, which is absolutely necessary, not been realized. Since only the compressive force in the rotor is working, only about 15% of the wind force is converted. Under load, the output collapses, so that this equipment is not suitable low wind velocities ranging preferably from the 1 m/s to about 3 m/s. The compressive force works in the rotor wings only up to the end of the deflecting vane and transfers the pressure subsequently into the next, compartment, where it then undesirably becomes a counterpressure.

Furthermore, the DE 30 01 385 discloses another solution. The rotor consist here of blades, as a result of which it is not suitable for any practical flow-through. Because the attack angle is too flat, the selected solution with 12 admission surfaces does not make an optimum, that is, the largest possible wind attack surface possible, as a result of which the blades convert only the pressure from the wind force. The blades in the rotor discharge the pressure in the subsequent admission compartment, as a result of which there are, once again, undesirable counter-flows. With this solution also, the disadvantage may be noted that the output abates very rapidly and the utilization of a wind velocity of the order of only 1 m/s to about 3 m/s is not possible.

Furthermore, with the WO 91/19093 "VALSAMIDIS" a solution is known, which works on the principle of flow-through, the forces from the wind been utilized in the form of the pressure as well as of the sail pull. In this connection, 16 admission surfaces are matched to an eight-wing rotor. The deflection vanes, as characteristic features, have a conical shape, which, however, brings about no improvement for the ascent of the flow, since the guide vanes are constructed too narrow. A variable configuration of the angle of slope is unnecessary, because, in the case of an accurately adjusted ratio between rotor wings and admission surfaces, a constant occurs, which realizes an approximately 15% flow-through. The guide vanes, disclosed in the VALSAMIDIS solution, moreover have the pressure side tangents of the aerodynamic configuration disposed structurally on the wrong side. The round openings in the center of this equipment, described pursuant to the solution, take away the possibility of flow transposition from the flow-through wings. In addition, there is the disclosure that the cover plate and the base plate may be perforated, as a result of which the flow disadvantageously emerges to the outside at a non-working side. The wings of this solution are constructed sickle-shaped with the configuration of a quarter moon. However, it is already known from aircraft construction that this shape of wing conceivably has poor lift values. The construction selected, with the admission surface principle indicated, brings about a utilization of about 85 percent of the wind surface at the building or at the facility. The admission surface exposition disclosed represents a relatively advantageous embodiment, but does not come close to the ideal state. In this way, the wind is diverted to the outside, as a result of which a loss in capacity is to be noted in the final analysis. In spite of the given flow-through capability, the eight rotor wings form a funnel, which hinders flow-through. For the rotor wing shape selected, these wings are constructed too short, as a result of which the path of work of the wind is also too short. Consequently, only the wind pressure and the sail pull are working in this equipment, the aerodynamics not being advantageous. The flow-through air does not work from the inside to the outside, because the air is not effective counter to the funnel behavior of the wings. The distance between the rotor and the housing of the admission surfaces is a disadvantageously large. The horizontal admission surfaces, which could prevent such a loss, are absent in this equipment.

The DE 88 04 674 discloses a further variation of the solution with a vertical rotor, which operates according to the Savonius principle. For this variation, only the angle of incidence and the curvature of the wing are changed. Due to the heavily rounded wing surfaces, the flow-through rotor becomes an extremely slow-running rotor. The braking due to the blades, running in the opposite direction in the wind pressure, is disadvantageous. This equipment does not have a sail pull or aerodynamics. If it were to be equipped with introducing surfaces, it would work relatively well at low wind velocities as a slow-running rotor. At higher wind velocities, this slow-running rotor levels out rapidly, comparable with a centrifugal governor, to a low r.p.m. This rotor is not suitable as a high-performance rotor.

It is therefore an object of the invention to develop a wind power facility with a vertical rotor and associated guiding surfaces, which converts all possible wind forces optimally into energy. Special attention is paid to a best-possible collaboration and conversion of all useful forces from the wind.

Aside from the various utilizations of the converted wind energies, attention is paid to a usable frequency stability and to an advantageously adapted, well-balanced weight distribution, which can be noted in the interaction between the admission surface elements, rotor, rotor wings and building. Moreover, it is also a special object of the invention that the work of recovering energy is commenced already at a wind velocity of 1.5 m/sec. Moreover, it is an objective that the wind power facility operates reliably even in hurricane situations and does not have to be taken out of the wind. This has to happen in such a manner that the facility can utilize even high wind velocities fully, without having to be braked, for recovering energy. In this connection, however, the facility is equipped with a self-protection against extremely high wind velocities, as a result of which a pressure cushion protects against destruction. It is furthermore an object that the whole structure consists of balanced admission surface statics and that there are no additional components, which hinder or limit spacewise the function of the wind power facility. It is a further object of the inventive wind power facility that the individual structural components are matched harmoniously to one another, so that the different forces and velocities arising do not hinder or even cancel one another in any phase of the operation. For this purpose, the structure is to form a closed unit and have the shape as well as the appearance of a columnar tower, the facility being protected against the weather. Not only is the structure to be adapted to nature, it should also offer good advertising possibilities. Finally, inexpensive materials are to be used and the facility is to personify simple but robust technology, for which the Magnus effect behind the facility is to have an effect like a strong undertow.

This objective is accomplished by the technical distinguishing features indicated in the characterizing part of claim 1.

Pursuant to the solution, the inventive wind power facility consists of a foundation, on which a machine space is placed. Furthermore, it consists of a cylindrical admission surface construction in several appropriately disposed stories for the respective structural height. Pedestals for a preferably polygonal construction of the machine space are disposed in the foundation. The cylindrical column of the tower is disposed on the roof of the machine space. The cylindrical design of the admission surface construction consists of an admission surfaces outer ring, which may have a different number of stories.

Each individual story consists of a ceiling boundary and a floor boundary. Between these, a total of twelve vertical admission surface elements are disposed. These are the only static parts between the floors of the stories. The floors of the stories are connected reliably, preferably by welding, with the associated admission surface elements and are seated on the roof of the machine space. In the center of the facility, there is a cylindrical shaft, which extends through the whole of the facility down into the machine space. The upper last story is terminated with a preferably conical roof. The rotor axle extends as far as the bottom of the machine space. A vertical rotor installation is disposed in the cylindrical shaft and consists of a centrally disposed rotor axle and the individual rotor stories with 3 wings per story. A generator is positioned in the rotor axle, the seat of the specific coil and the placement of the permanent magnets being spirally offset. In this way, the generator is around the core of the axle and extends over the whole length of the latter. With that, optimum space utilization and good energy yields are achieved, the length of the generator always being adapted to the construction selected, mainly to the number of stories and also to the height of the individual stories.

The vertical admission elements and the rotor are designed so that the rotor runs counterclockwise. In each story of the admission surface construction, above and below the admission compartments, there are horizontal admission surface elements, which are in a range of 10° to 15° rising inwards and are not curved, but also not constructed aerodynamically. If the admission surface elements are too steep, backpressure would develop, the consequences of which would be a lowering of the urgently required wind velocity for recovering energy. The same also holds good for the rotor wings, overall the construction of admission surface elements and rotor wings is such, that the largest possible wind velocity is retained for the flow-through, since otherwise a decrease in output is noted. The inventive wind power facility moreover is equipped with an ideal flow-through rotor, which has three specially configured wings. The three aerodynamic and curved wings are in such a relationship to one another, that there is no forced reduction in wind velocity due to an operating cycle in the rotor. Even if the rotor barely commences to run at a wind velocity of about 0.5 m/s, the flow-through commences to build up immediately. The attack angles of the wings of the rotor interact with the attack angles of the vertical admission surface elements and, accordingly, are matched to one another. The attack angle of the wings of the rotor arises from the distance between the center of the rotor axle and the respective wing end and the front boundary of the leading edge of the wing, which passes through the center of the rotor axle. The openings between in each case two wings, which must exist for flow-through, is closely related to the depth of the wings. On the basis of the average value of the depth of the wings, the length of the outer wing curvature is five times the distance measured from the center of the rotor to the respective end of the wing. In practice, this can easily be marked out with a yarn. As far as the curvature is concerned, the construction of the wing corresponds to that of the high-speed engine of the Schulz principle as a three-wing flow-through rotor, which was developed from the Savorius rotor system.

Optimum aerodynamics were introduced and attained in the case of the inventive rotor with the shape of the wing curvature. Closely associated with this is the configuration of the wing shape at its front side with a curved leading edge. By these means, it is achieved that the angle of attack, which changes discontinuously but fluidly during the rotation, becomes constantly more advantageous aerodynamically. The thickness of the rotor wing changes depending on the angle of attack. In the case of the inventive configuration, the positive effect of the curved leading edge of the wing of the front side becomes effective up to the minimum start of the leading edge curvature, which points opposite to the direction of rotation. This forms the ideal range. Due to the curved shape of the rotor wings, independently of how pronounced the leading edge is, the sail pull is caused to work particularly productive when it dips into the admission compartment. If the rotor wing were constructed with a uniformly stretched supporting surface shape, an adequately large surface would not be available for an energy-obtaining sail pull. Since the wind force is converted most advantageously with the aerodynamic shape of the rotor wings, it requires the sail pull as initial velocity in the preceding operating cycle. The sail pull thus acts as a connecting link, so that the inertia in the rotor is overcome and a fluid undisturbed course of motion of the rotation is ensured. Accordingly, by means of an advantageous aerodynamic configuration, the highest possible velocity and an optimum energy recovering are achieved. For this purpose, the aerodynamics work in the outer region of the rotor wings up to the front line of the curved leading edge. The sail pull works, sliding on the upper curvature of the wings from the rear to the front. The wind pressure works in the heavy pressure region of the lever in the slower inner region of the rotor wings. The rotor wings are disposed ideally in such a manner to one another, that the sail pull and the aerodynamics ensure the best possible flow-through of the wind velocity without obstruction, which basically is possible only if there are three wings in the rotor, since they have the best angle of attack for the flow-through. In the case of an arrangement with four wings, one wing always blocks a frictionless, natural flow-though at least partly, comparable with a wall at right angles. The consequence, in the case of this variation, is a reduction in the velocity due to the resulting braking resistance.

If a two-wing rotor is selected as a variation and, in addition, the position and the shape of the wing are disadvantageous, the wind flows through these even without carrying out any work or bestowing any energy.

When more than four rotor wings are used, a sort of air cushion braking builds up necessarily due to structural obstacles and mutual impediments and leads to an unfavorable frequency stability. In the case of three-wing rotors, this state sets in only at hurricane strengths, as a result of which, however, a desirable protective function also comes into force simultaneously. The matching of the vertical admission surface elements with the rotor takes place in such a manner that, in hurricane-like winds, the vertical admission surface elements are filled maximally and, with the counter-flow, act as air cushions. The admission surface elements have the special function of covering the rotor wings, which run back in the direction of the wind. The wind therefore does not press on the opposite side of the wing region; instead, the deflected wind is directed additionally onto the positively working side.

By a slight inclination, the wind is prepared already in the ramp for the rotation. In the case of a total of twelve vertical admission surface elements, the angle of attack is such that the first vertical admission surface element and the fourth admission surface element enclose an angle of 90° and comprise three surfaces. In the attack field of the wind surface at the facility, each wing of the rotor works consecutive over four admission compartments. This embodiment has the advantage that each admission compartment receives a new and high initial velocity and the pressure, which is brought about by the through-flow, still works in the fifth up to the ninth compartment. Residual work is performed by the second wing in the rotor in the tenth and eleventh admission compartment. In the rear region of the facility, a suction develops as a Magnus effect, which is placed around the facility like a sheath. Due to the left-handed rotation of the rotor, there is an inflow once again on the right side of the admission surface element of at least two admission compartments, although these are no longer taken hold of frontally by the wind.

The two-and-one-half-fold depth of the vertical admission surface elements corresponds to the diameter of the rotor. The vertical admission surface elements deviate by 36° to 38° counter to the direction of rotation of the rotor, from the line drawn through the center of the rotor. The vertical admission surface elements can alternately be straight or also curved. The curvature must not be greater than the inclination and curvature of the rotor wings. An aerodynamic arching is applied at the leading edges of the vertical admission surface element. The curved shape with the aerodynamically arched head shape, which must not in any way correspond to the curved leading edge shape of the rotor wings, serves as preferred variation of an optimally functioning vertical admission surface element. This difference comes about because the vertical admission surface elements are not subject to any rotation, as is the rotor. At the same time, this is associated with the advantage that the resulting pressure from the rotation counters the Flettner effect and the statics of the structure as a whole are equalized and stabilized. On the other hand, it is well known that other facilities vibrate at very high wind velocities. In extreme cases, such vibrations can lead to the destruction of the whole facility.

Pursuant to the invention, the wing is constructed as follows. The wings in the rotor provide a region of ideal functional capability in different wind areas. The operating region commences at the aerodynamic form, as already described for the vertical admission surface elements. This can be hollowed out at the underside to such an extent that a regular leading edge, opposite to the direction of rotation, results at its front edge. An almost parallel wall or profile thickness issues from the leading edge over the whole depth of the wing and is formed into a point at the rear end on the last, about 10% of length. The whole curvature of the wing up to the leading edge corresponds to the line shape of the high-speed engine of Schulz. Pursuant to the invention, there is a further aerodynamic adaptation for this. These two wing shapes and the region in between form the ideal region, used pursuant to the invention. Only in the wind-weak regions is a profile, which has a special aerodynamic shape, used for this embodiment of the facility. This profile is configured so that the tangent on the pressure side, namely the underside of the wing, is a straight line. As a proportional dimension, for a profile length of 157 cm, the greatest thickness of the wing is 28 cm. The aerodynamic profile is formed flexibly. The depth of the wing has a tolerance range. The flow-through gap between two wings corresponds to twice the dimension of the profiled length of the wing, measured at the curvature. The opening between the wings, from the end of the wings in continuation to the inner curvature of the other, corresponds to one fourth of the distance from the center of the rotor axle up to the outer edge of the rotor as well as also to the distance between the center of the rotor axle to the wing, when the guided line points with 90° on the wing. The line, drawn from the leading edge of the wing up to the center of the axle and of the outwardly going line to 90° from the axle, provides the average measured value of the wing depth of the profile. This means that 10 percent in the plus range and 10 percent in the minus range, that is 100° and 80° give the range of the ideal length of the wing depth. The five-fold distance from the center of the axle to the wing, measured over the wing curvature, gives the profile length.

The dimensions of the profile of the vertical admission surface elements arise out of the relative dimension of 70 cm length, to the lower curvature of 6 cm and the thickest aerodynamic formation of 7 cm, which runs out into a uniform tapering. The vertical admission surface elements are disposed radially, as a result of which the wind power facility is independent of the direction of the wind. The outer ring of the admission surface has a projection, which corresponds to one-third of the diameter of the rotor.

In detail, the operating cycles in the inventive facility are as follows. Where the back of the rotor wing enters the incident flow field of the admission surface, it is attracted by suction by the sail pull. Since the whole of the admission compartment is still empty, the air flows unimpeded past the entering wing and presses to almost 90° into the inner curvature of the previous wing. It is the only situation in which the flow incident on the wing is so steep. However, since the sail pull moves the rotor more quickly than the wind pressure can realize in the subsequent wing, there is no frontal back up. Due to the subsequent aerodynamics at the first wing, the wind velocity in the interior of the rotor increases. At the same time, however, the preceding second wing catapults into an outer, advantageous inclined position, which is reduced smoothly to zero in the angle of the incident flow. The third wing also profits from the initial phase, because, as a result of the perpendicular incident flow, the pressure escapes to both sides onto wing two. Over the center, there is now incident flow on the third wing in an inclined position of 45°. Due to the immediate deviation of the pressure to the outside by wing two, wing three merely receives a sort of pressure pulse. In this position, the wings are disposed so advantageously to one another, that the pressure has an effect on wing two in the center of the wing and the still slight wind force acts on the innermost section of the third wing. As the wind velocity abates, the incident flow surfaces and working surfaces increasingly work automatically and smoothly at the inner and short lever of the rotor wing. If subsequently, the first wing moves somewhat further into the admission compartment, the work of aerodynamics commences. As a result of the overpressure and underpressure at the wing, the wind flows into the interior of the rotor only at a higher velocity at the wing surfaces. The higher velocity is, however, also required for the preceding second wing, because the flow no longer presses at 90° on the surface and instead slides from about 65° to 0°. The flow through effect is increased in that, at first, the short lever at the inner curvature is operated and then goes over smoothly to the long lever. During this flow-through, all forces act precisely at the sites, where they produce the greatest benefit. The aerodynamics work with a different power of about 75% of the path in admission compartment. The curved leading edge of the wing permits an incident flow at a sliding working angle, which is always relatively ideal. After the leading edge of the wing has left the compartment, the wind pressure commences to act on the inner part of the wing. The incident flow angle commences from 0° to 90° and, after the rotation of the wing, once again from 90° to 0°.

The incident flow on the second wing, with an inclination of 45° is also from 0° to 90°. However, the incident flow on the second wing is constant at 45°, because the wind direction leads through the center of the rotor and varies only in the force of the incident flow.

The greatest force is acting when the flow in the inner curve of the first wing is incident at an angle of 0° and decreases up to the 90° position. The work performed breaks down when the first wing tilts the flow to the outside in the course of the rotation. However, since four admission compartments act consecutively on each wing in the whole of the wind attack surface of the facility, there is a four-fold extension of the cycle. At the same time, there is mixing of the flows, which do not interfere in any way with one another since each flow conversion works at different sites in the rotor. An ideal interaction of possible conversions of wind power results, the front wing in each admission compartment of the wind attack surface always receiving a greater initial velocity. The resulting suction of the Magnus effect operates two further admission compartments in the rear region of the facility and works in the remaining rear region as diffuser. If the number of stories is different, the whole rotor has a differently selected offset of the wing groups.

The number of stories determines the total division of the rotor wings over the 360° of the periphery. A particularly advantageous and effective division of the wing positions is possible already with four stories. With that, a constantly ideal position of the wings in the facility is assured. This makes a balanced distribution of forces at the rotor possible and ensures an optimum frequency stability. Moreover, the mass of the rotor also contributes to the frequency stability due to its centrifugal effect. The vertical and horizontal admission surface elements and the wings are constructed rigid and immovably. This means that flexible materials, such as tarpaulins, textiles or sheets are not used anywhere. The surfaces of the facility parts are smooth, without grooves or stiffening corrugations.

The facility achieves its effectiveness as a total system in a complex collaboration by the structural configuration of the component parts shown. In addition, it is also possible to include a pre-compressor in the facility, in order to increase the wind velocity even more.

For this purpose, a compartment of the pre-compressor must stream against at least two admission compartments. Due to the greater projection in the lower region, the known variation of the energy fir also has the function of a pre-compressor. In addition, there is an upward flow at the facility. However, the flow does not have any negative effects with respect to reducing the output.

The inventive wind power facility shown can also be installed on a roof or a ship. Especially in this case, it may appropriately have an elevator for extending or retracting it. When used on a ship, the Flettner effect may, under some circumstances, even have a positive effect on the traveling speed.

Figure 1:
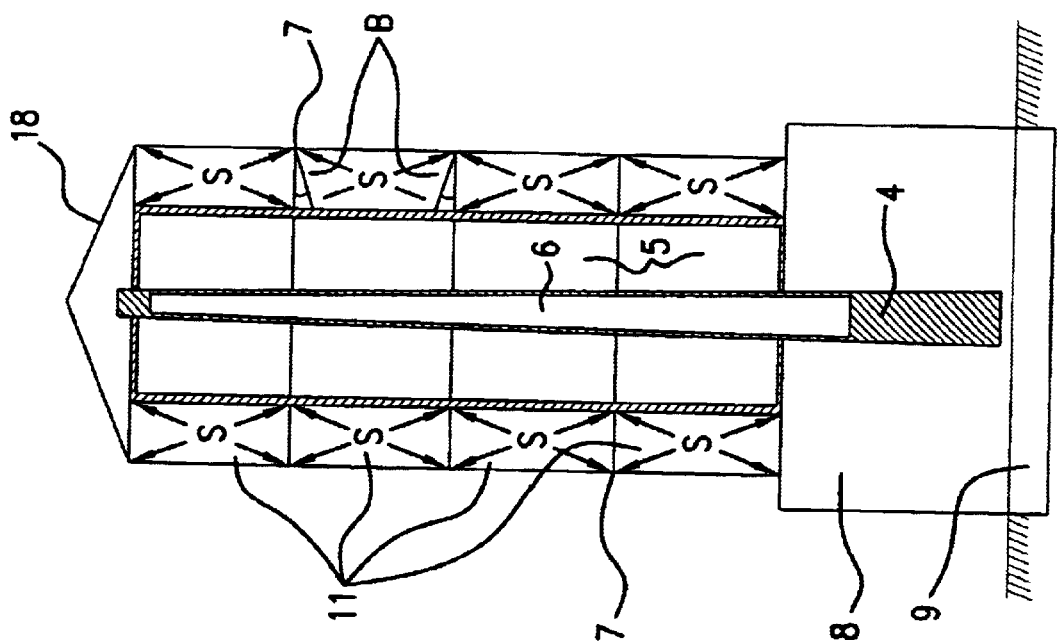
Figure 4:
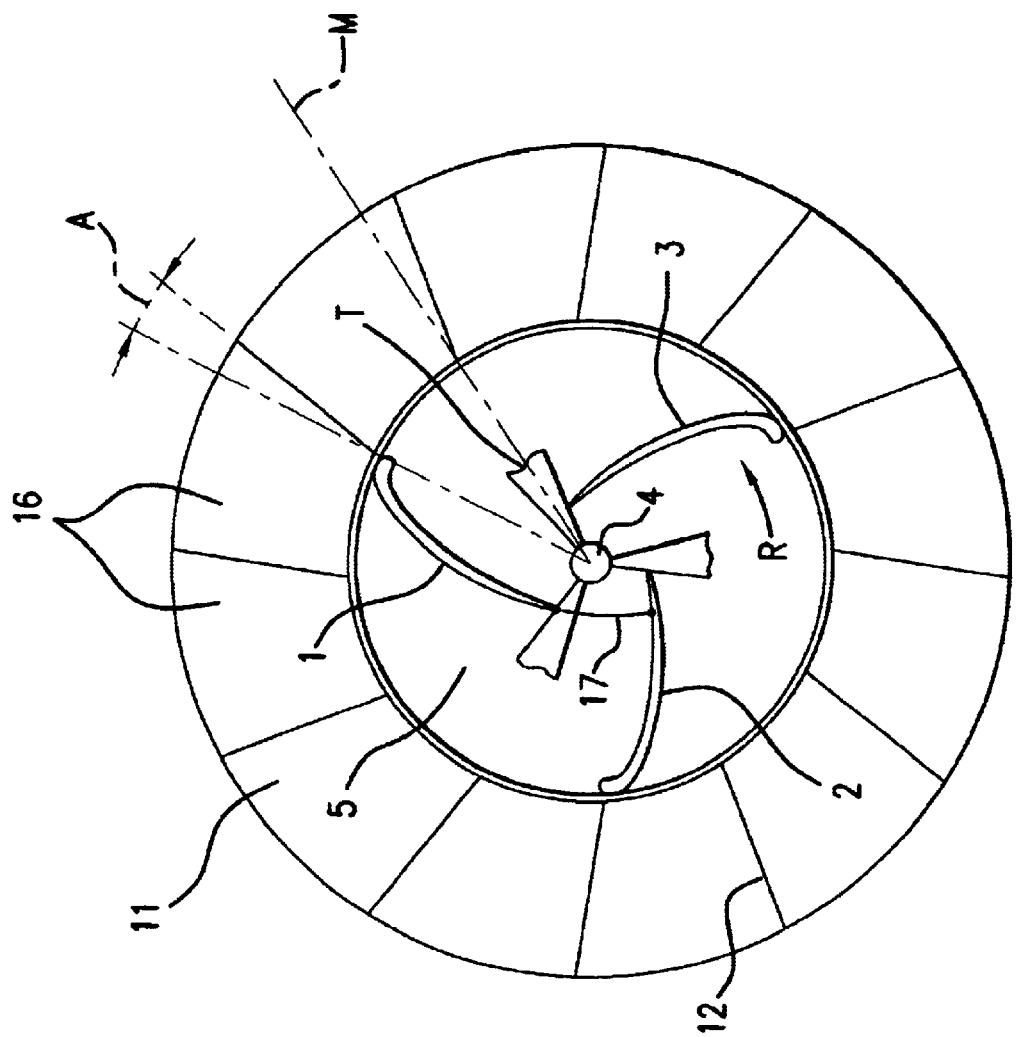
Figure 3:
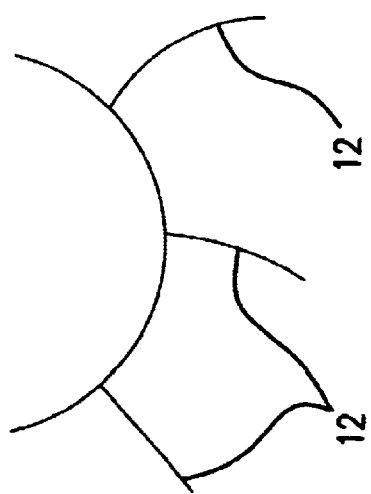
Figure 7:
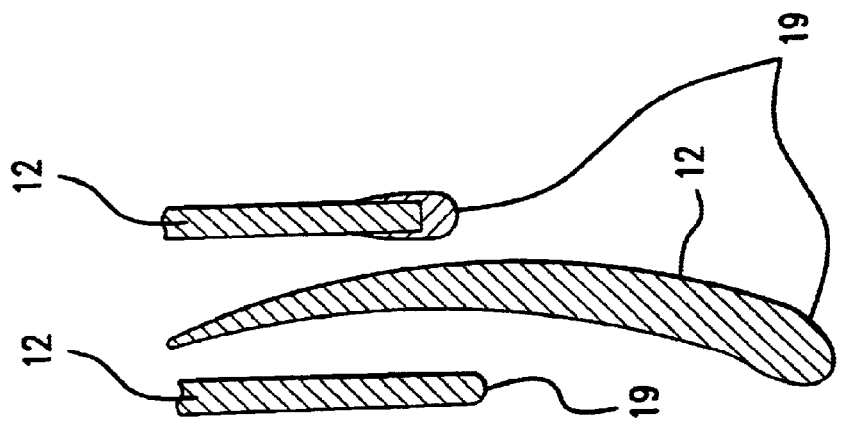
Figure 6:
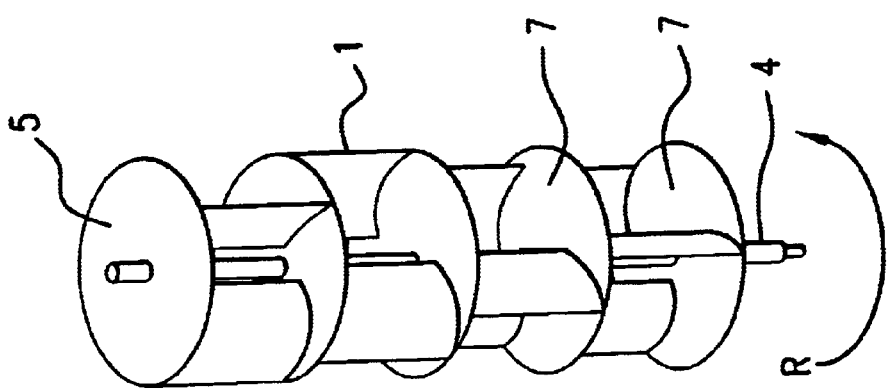
Figure 5:
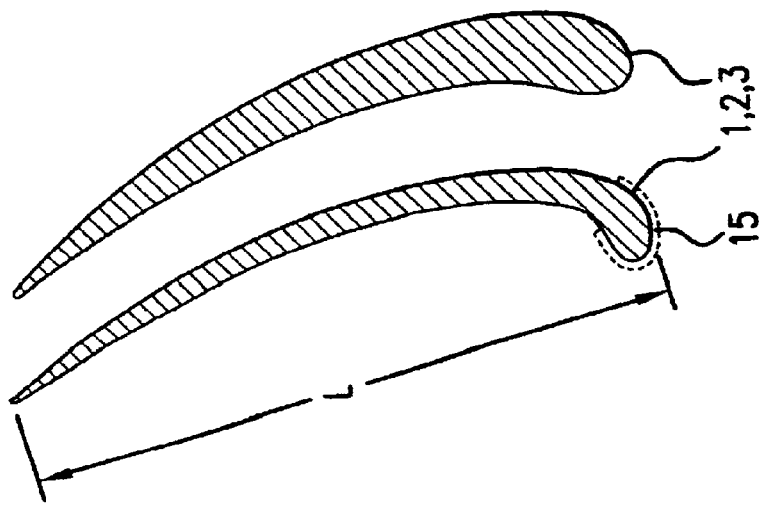

The invention is described in greater detail below by means of an example. In the associated drawings, FIG. 1 shows a section of a wind power facility, FIG. 2 shows a perspective view of the admission surface statics, FIG. 3 shows a variation of the admission surface, FIG. 4 shows a horizontal section of the rotor and the admission surface statics, FIG. 5 shows a section of a rotor wing, FIG. 6 shows a rotor with wing groups offset story by story and FIG. 7 shows a section of the vertical admission surface element.

An octagon al machine space 8 and a cylindrical admission surface construction 11, consisting of several stories, are disposed on a foundation 9. In the center of the facility, there is a rotor 5, which has stories, which are parallel to the admission surface construction 11. The cylindrical admission surface construction 11 rests on the roof 18 of the machine space 8. The cylindrical admission surface construction 11 consists of a cylindrical admission surface outer ring 14, which may have a different number of stories. Each story consists of a ceiling boundary and a floor boundary, as well as of horizontal admission elements 13, on which 12 vertical admission surface elements 12 are disposed.

These horizontal admission elements 13 and the twelve cylindrical admission surface element 12 are the only static parts between the stories and form the admission compartments 16. These component elements are connected preferably by welding. In the center of the facility, there is a cylindrical shaft 10, which extends through the whole of the facility down into the machine space 8. The top story is finished off by a preferably conical roof 18. The cylindrical admission surface construction 11 rests on the machine space 8. The vertical rotor facility consisting of the rotor 5, the rotor axle 4, which at the same time accommodates the generator 6 and the story floor 7, is disposed in the cylindrical shaft 10. Wings 1, 2 and 3 per floor are disposed in each story floor 7. The rotor 5 rotates counter clockwise. FIG. 1 shows the effect of the statics S in the individual sections of the device. In each story of the cylindrical admission surface construction 11, above and below the admission compartment 16, there are twelve horizontal admission surface elements 13, which are in a range of 10° to 15° to the story floor as angle of attack of the horizontal admission surface elements. These straight-surface, horizontal admission surface elements 13 rise from the outside to the inside in said range of angles, so that the desired compression of flow comes about. The opening 17 between two wings, which must be present for the flow-through, is determined in relation to the depth of the wing L. For an average measure value M of the wing depth L, marked out with a yarn, the five-fold distance, measured from the center of the rotor axle 4 to the end of the wing 1, 2, 3, gives the length of the outer wing curvature. The ideal wing depth range T is indicated by hatching in FIG. 4. At their front side, the wings 1, 2, and 3 have a curved leading edge 15. In spite of the changing incident angle, the aerodynamics work unchangingly. The positive effect of the curve leading edge 15 of the front end of the wings 1, 2, 3 is still effective up to the slight curvature of the leading edge, which proceeds oppositely to the direction of the rotation. The sail pull reacts very well to this ideal shape when the wings 1, 2 or 3 move into the admission compartment 16 for incident flow.

The wings 1, 2 or 3 must be disposed so ideally to one another, that the sail pull and the aerodynamics ensure that the wind flows through ideally without being impeded. The vertical admission surface elements 12 have the special task of covering the rotor wings, 1, 2, 3, which run back in the wind direction and, in addition, to guide the wind to the positive side. By means of an attack angle A of the vertical admission surface elements of about 36° to 38°, the wind is prepared already in the ramp for the subsequent rotation R. If there are twelve vertical admission elements 12, the attack angle A is established in such a manner that the first and fourth of the vertical admission area elements 12 form an angle of 90° and comprise three admission compartments 16. In the attack field of the wind surface at the facility, each wing 1, 2, and 3 in the rotor 5 works consecutively over four admission compartments 16. This has the advantage that each admission compartment 16 receives a new and higher initial velocity.

The first initial velocity is formed by the residual momentum of the last wing 3 in the last operating cycle. The second initial velocity is realized by the first operating cycle of the wing 1 in the first admission compartment 16. The third initial velocity is realized by the second operating cycle of the wing 1 in the second admission compartment 16. The fourth initial velocity is realized by the third operating cycle of the wing 1 in the third admission compartment 16. An increase in the energy potential of the wind power conversion is noted in the four admission compartments 16 of the wing working region. No matter which wing is working, two admission compartments 16 are constantly served by the Magnus affect flow. On the other hand, subsequently, in the rear region of the facility averted from the wind, the diffuser effect is seen, which is a consequence of the Magnus effect. The Flettner effect merely exerts a transverse force on the statics of the facility. However, this becomes effective only when the wind power facility is installed on a ship. In the ideal case, the Flettner effect contributes to increasing the traveling speed.

The two-and-one-half-fold depth of the vertical admission surface elements 12 correspond to the diameter of the rotor 5. The vertical admission surface elements 12 are either straight, preferably slightly curved or also curved, as shown in FIG. 3 and have an aerodynamic configuration of FIG. 7. Moreover, the greatest curvature of FIG. 3 is not greater than that of the rotor wings 1, 2, 3. At the front side of the vertical admission surface elements 12, there is an aerodynamic curvature 19. However, at least a temporary curvature is produced. FIG. 6 shows the rotor 5 with wing groups in the system of four stories, the wing groups being offset from story to story. From the point of view of a single, specified, blown against admission surface 16, the mode of action of the rotor 5 with its wings 1, 2, 3, is as follows. When the back of the wing 1 enters the blown against admission compartment 16 in the first operation cycle, it is attracted suction-like by the sail pull. Since the whole of the rotor compartment is still empty, the air flows past the incoming wing 1 without obstruction and presses to almost 90° into the inner curvature of the preceding wing 2. The rapid sail pull passes on the initial speed immediately to the aerodynamics and initiates the second operating cycle. Due to the aerodynamics at wing 1, the wind velocity increases in the interior of the rotor 5. As a result, the subsequent wing 2 is tilted rapidly from 90° to 0° to the direction of flow and, with that, realizes the necessary flow-through for maintaining the optimum possible wind velocity. At the instant when the 90° flow strikes the wing 2, a brief flow through the center of the rotor 5 impinges at about 45° in the form of a pressure pulse on the last wing 3. The aerodynamics work with different power up to about 75% of the wing path in the admission compartment 16. A curved leading edge 15 at the wing edge permits a constantly ideal incident flow in a sliding working angle in the incident flow. After the edge of the wing has left the admission compartment 16, the third operating cycle sets in, the wind pressure on the inner part of the wing 1 commencing to press. The angle, with which the wind flows against the wing 1 and which results from the flow-through direction from the compartment, commences from 0° to 90° and after the rotation of the wing 1, from 90° to 0°. From 0° to 90°, the subsequent wing 2 is also blown against at 45°, the maximum flow-thorough, however, falling back to 0. The strongest flow through at 0° incident flow at the inner arc of the wing 1 acts on the subsequent wing 2. In the last phase of the third operation cycle, wing 1 still carries out 50% of its pressure processing. At the same time, the new wing 3 takes up the work once again with the forces of the sail pull in the admission compartments 16 selected for consideration. Since the attack surface of the wind on the facility always serves four admission compartment 16, there is flow support and maximum utilization of the capacities of the wings 1, 2, and 3 and of the flow-through. The flow conversion becomes effective at different places in the rotor 5 and, due to the uniform compact construction of the whole rotor system, finally is fully effective without losses. The wing at the front receives a constantly higher initial velocity over the four admission compartments 16 of the wind attack surface and, aside from a slight flow into the compartment, the Magnus effect constantly works as a diffuser behind the facility. The frequency stability is achieved by the offsetting of the wing groups in the stories and by the fly-wheel effect. Depending on the number of stories, the wing groups are set up on the 360° of the periphery. This results in a constantly ideal setting for the most advantageous wind power conversions, which commence to work particularly at wind velocities from 1.5 m/s onward. The rotor surfaces, the surfaces of the wings 1, 2, 3 and the surfaces of admission elements 12, 13 are rigid and immovable. Flexible materials are therefore not used. Furthermore, all surfaces of the admission surface elements 12, 13 are absolutely smooth and have no interruptions, such as those caused, for example, by reinforcing corrugations and grooves.

The whole system is to be regarded as a unit, which is directed to a complex collaboration. A change in one factor or a structural distributing feature necessarily leads to a decrease in performance, as a result of which there is also interference with the vibration-free running of the facility. In the case of hurricane-like winds, excessive flow through of the facility is not possible, because the power conversion is leveled to a constant, so that movable parts are protected.

Due to the spiral build-up of pressure of the rotor 5 over the individual stories, the multi-compartment operation of the admission compartments 16, the different wind energy conversion possibilities, the different attack angles, the sliding aerodynamics in the rotation, the support of the initial velocity of all driving components in the individual operating cycles as well as in conjunction with the effects, working behind the facility, a collaboration to achieve maximum wind power conversion while utilizing the smallest to the larges wind forces, is achieved. At the same time, smooth running is achieved by equalizing the forces and avoidance of point-like attacks by forces on the wind power facility is ensured by the structural configuration. Due to the structurally achieved independence of the facility from the direction of the wing, there are no fluctuations due to temporally offset tracking. The wind velocity can be increased even further, especially in areas with weak winds, by using a conventional known pre-compressor of any construction.

What is claimed is:

1. A wind power installation based on the principle of flow-through, comprising:
    a containment structure forming a multi-story wind admission surface,
    a multi-story rotor mounted in the structure, the rotor being configured to run counterclockwise about a vertical axis and comprising three aerodynamically configured wings per story,
    the structure comprising twelve vertical wind admission surface elements per story,
    the surface elements being disposed radially with an attack angle ranging from 36° to 38°,
    the attack angle being defined as an angle between a radial line from the axis of the rotor to a tip of a said wing of the rotor and a line in a same plane as the radial line and formed by an imaginary vertical projection of a said surface element onto said plane so as to intersect the same wing tip, the attack angle being formed opposite the direction of rotation of the rotor relative to said wing tip; and
    a cylindrical wind admission surface outer ring, the radial distance from an inner periphery to an outer periphery of the ring corresponding to ⅓ of the diameter of the rotor.

2. The wind power installation of claim 1, wherein the containment structure comprises a foundation, a machinery enclosure seated on the foundation, a tower mounted on the machinery enclosure, the tower including the surface elements, a conical roof capping the tower, and a cylindrical shaft which accommodates the rotor situated in the tower.

3. The wind power installation of claim 1, wherein the stories of the containment structure are defined by horizontal floors, substantially horizontal wind admission surface elements at the upper and lower side of each floor, departure of which from horizontal defines a second attack angle of 10° to 15°, the surface elements at the upper surface of a floor ascending toward the rotor axis and the surface elements at the lower surface of a floor descending toward the rotor axis.

4. The wind power installation of claim 1, wherein the vertical surface elements and the substantially horizontal surface elements intersect to form wind admission compartments.

5. The wind power installation of claim 1, further comprising an axle, on which the rotor is mounted, an electric generator located in the machine space, the axle extending into the machine space and being operatively connected to the generator.

6. The wind power installation of claim 1, wherein the vertical surface elements have a slight curvature in the direction of their attack angle and a vertical outer edge of each has an aerodynamic curvature.

7. The installation of claim 1, wherein the wings of each story of the rotor are offset from the wings of each adjacent rotor by 360° divided by the number of stories, the offsets being unidirectional from story to story.

8. The installation of claim 7 wherein the number of stories is four.

9. The installation of claim 1, wherein the wings of each rotor each have an aerodynamically constructed leading edge.

10. The installation of claim 1, wherein an opening between ends of adjacent wings of each story of the rotor corresponds to a quarter of the distance from the axis of the rotor to an outer edge of the rotor.

11. A wind power installation based on the principle of flow-through comprising:
    a containment structure forming a multi-story wind admission surface,
    a multi-story rotor mounted in the structure, the rotor being configured to run counterclockwise about a vertical axis and comprising three aerodynamically configured wings per story,
    the structure comprising twelve vertical wind admission surface elements per story,
    the surface elements being disposed radially with an attack angle ranging from 36° to 38°, and
    the attack angle being defined as an angle between a radial line from the axis of the rotor to a tip of a said wing of the rotor and a line in a same plane as the radial line and formed by an imaginary vertical projection of a said surface element onto said plane so as to intersect the same wing tip, the attack angle being formed opposite the direction of rotation of the rotor relative to said wing tip, wherein an opening between ends of adjacent wings of each story of the rotor corresponds to a quarter of the distance from the axis of the rotor to an outer edge of the rotor.

12. The wind power installation of claim 11, wherein the containment structure comprises a foundation, a machinery enclosure seated on the foundation, a tower mounted on the machinery enclosure, the tower including the surface elements, a conical roof capping the tower, and a cylindrical shaft which accommodates the rotor situated in the tower.

13. The wind power installation of claim 11, wherein the stories of the containment structure are defined by horizontal floors, substantially horizontal wind admission surface elements at the upper and lower side of each floor, departure of which from horizontal defines a second attack angle of 10° to 15°, the surface elements at the upper surface of a floor ascending toward the rotor axis and the surface elements at the lower surface of a floor descending toward the rotor axis.

14. The wind power installation of claim 11, wherein the vertical surface elements and the substantially horizontal surface elements intersect to form wind admission compartments.

15. The wind power installation of claim 11, further comprising an axle, on which the rotor is mounted, an electric generator located in the machine space, the axle extending into the machine space and being operatively connected to the generator.

16. The wind power installation of claim 11, wherein the vertical surface elements have a slight curvature in the direction of their attack angle and a vertical outer edge of each has an aerodynamic curvature.

17. The wind power installation of claim 11, further comprising a cylindrical wind admission surface outer ring, the radial distance from an inner periphery to an outer periphery of the ring corresponding to ⅓ of the diameter of the rotor.

18. The installation of claim 11, wherein the wings of each story of the rotor are offset from the wings of each adjacent rotor by 360° divided by the number of stories, the offsets being unidirectional from story to story.

19. The installation of claim 18 wherein the number of stories is four.

20. The installation of claim 11, wherein the wings of each rotor each have an aerodynamically constructed leading edge.

* * * * *